United States Patent Office 3,093,627
Patented June 11, 1963

3,093,627
POLYPEPTIDES AND PROCESS FOR THEIR MANUFACTURE
Robert Schwyzer, Riehen, and Heini Kappeler, Birsfelden, Switzerland, assignors to Ciba Corporation, a corporation of Delaware
No Drawing. Filed June 23, 1959, Ser. No. 822,187
Claims priority, application Switzerland July 3, 1958
2 Claims. (Cl. 260—112)

The present invention relates to the manufacture of new hexapeptides of the formula L-glutamyl-L-histidyl-L-phenyl-alanyl-L-α-(lower aminoalkyl)-α-amino-acetyl-L-tryptophyl-glycine and corresponding compounds that contain the glutamine radical instead of the glutamic acid radical. The new compounds have the stimulating action of the natural pituitary hormones on the melanocytes (MSH action) but compared with them they have the advantage that they are much easier to synthesise since they contain a sequence of only 6 amino acids, while α-MSH is composed of 13 and β-MSH of 18 amino acids. The new hexapeptides can be used as medicaments instead of the natural MSH, or as intermediate products for the manufacture of medicaments with a rather long chain of amino-acids more especially L-glutamyl-L-histidyl-L-phenylalanyl-L-arginyl-L-tryptophylglycine of the formula

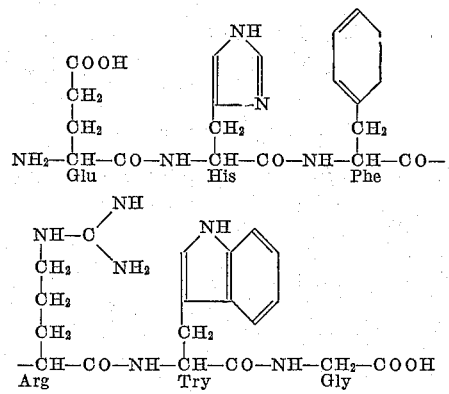

and the corresponding L-glutaminyl peptide. The residue of an L-α-(lower aminoalkyl)-α-aminoacetic acid is more especially an L-arginyl, L-ornithyl and L-lysyl radical.

The new peptides are prepared by any one of the methods conventionally employed in manufacturing peptides, the amino acids being linked one by one successively or first small peptide units are formed and these are then linked together. Thus, one of the amino acid or peptide molecules respectively in the form of an ester can be linked with a further amino acid molecule or peptide molecule containing a protected amino group, in the presence of a condensing agent such as a carbodiimide or of a phosphorous acid ester halide; or the amino acid ester or peptide ester containing a free amino group can be reacted with an amino acid or a peptide containing an activated carboxyl group (and a protected amino group), for example an acid halide, azide or anhydride, or with an activated ester such as a cyanomethyl ester or carboxymethyl thiol-ester. Conversely, an amino acid or a peptide containing a free carboxyl group (and a protected amino group) can be reacted with an amino acid or a peptide containing an activated amino group (and a protected carboxyl group), for example with a phosphite-amide. Any one of the aforementioned methods can be used for forming a peptide bond according to the present invention, though the methods used in the example are particularly advantageous. Any free functional groups not participating in the reaction are advantageously protected, primarily by hydrolysis or reduction of radicals that are easy to split off, the carboxyl group preferably by etserification (e.g. with methanol, benzyl alcohol or para-nitrobenzyl alcohol), the amino group for example by introducing the tosyl or trityl radical or more especially the carbobenzoxy group or a colored protective group, such as the para-phenylazo-benzyloxycarbonyl group or the para-(para'-methoxyphenylazo)-benzyloxycarbonyl group (MZ). The imidazole group (im) of the histidine, for example, is protected by the benzyl radical, while the amino group in the guanido grouping of arginine is protected by the nitro group. It is, however, not necessary to protect the said amino group of arginine during the reaction.

The conversion of a protected $NH_2$ or NH group into a free group and the conversion of a functionally converted carboxyl group into a free carboxyl group in the course of the process of making the hexapeptides and intermediates is performed by conventional methods by treatment with hydrolysing or reducing agents respectively.

Depending on the reaction conditions the new compounds are obtained in the form of bases or of salts thereof. The salts yield the bases in as such known manner. From the latter salts can be prepared by reaction with acids capable of forming therapeutically useful salts, for example salts with inorganic acids such as the hydrohalic acids (for example hydrochloric or hydrobromic acid), nitric acid, thiocyanic acid, sulfuric acid, phosphoric acid, or organic acids such as acetic acid, propionic acid, glycolic acid, lactic acid, pyruvic acid, oxalic acid, malonic acid, succinic acid, maleic acid, fumaric acid, tartaric acid, citric acid, benzoic acid, cinnamic acid, salicylic acid, 2-phenoxy- or 2-acetoxy-benzoic acid, mandelic acid, methanesulfonic acid, ethanesulfonic acid, hydroxyethanesulfonic acid, benzenesulfonic acid or toluenesulfonic acid.

The hexapeptides prepared by the present process can be used in the form of pharmaceutical preparations which contain the peptides in admixture with a pharmaceutical organic in inorganic excipient suitable for enteral or parenteral administration. The excipient is made from a substance that does not react with the polypeptide such, for example, as gelatine, lactose, glucose, common salt, starches, magnesium stearate, talc, vegetable oils, benzyl alcohols, gums, polyalkyleneglycols, white petroleum jelly, cholesterol or other known medicinal excipients. The pharmaceutical preparations may be in the form of, for example, tablets, dragees, powders, ointments, creams, suppositories, or liquid in the form of solutions, suspensions or emulsions. They may be sterilized and/or contain auxiliaries such as preserving, stabilizing, wetting or emulsifying agents. They may also contain further therapeutically useful substances.

The following examples illustrate the invention:

EXAMPLE 1

N-Trityl-L-Tryptophane Methyl Ester 13 grams (0.051 molecular proportion) of L-tryptophane methyl ester hydrochloride are suspended in 180 cc. of absolute chloroform in a round bottom flask of 500 cc. capacity, cooled to 0° C. and then treated with 15.7 cc. (0.113 molecular proportion) of dry triethylamine. While shaking the flask, 14.3 grams (0.051 molecular proportion) of trityl chloride are then added in portions to the cooled reaction mixture, which is allowed to react for 30 minutes at 0° C. and then for 6 hours at room temperature. The chloroformic solution is washed successively with water, with 10% citric acid solution, with N-sodium bicarbonate solution and finally with water until neutral, dried over sodium sulfate and then concentrated to a small volume in vacuo. To prevent excessive foaming methanol is added, and the whole operation is repeated twice more. When the evaporation residue is dissolved in 10 cc. of methanol, crystallization sets in spontaneously. Yield: 20.9 grams (88% of theory) of N-trityl-tryptophane methyl ester, melting at 150 to 152° C. After having been recrystallized once from methanol the substance melts at 156–157° C. $[\alpha]_D = +45° \pm 1°$ (c.=1.075 in methanol).

EXAMPLE 2

N-Trityl-L-Tryptophane 14.8 grams (0.033 molecular proportion) of N-trityl-L-tryptophane methyl ester (cf. Example 1) are dissolved in 30 cc. of propyleneglycol on an oil bath heated at 200–205° C. 45 cc. of a 20% solution of potassium hydroxide in propyleneglycol are added to the hot solution, whereupon part of the dissolved ester separates out again, and 2 minutes later a clear solution is again obtained. Hydrolysis is performed for 6 minutes at a bath temperature of 205° C., the product of the hydrolysis is then rapidly cooled and poured into 600 cc. of ice water. While cooling and stirring intensively in the strongly alkaline solution it is adjusted to pH=6 with 10% citric acid solution and the separated trityl-tryptophane is extracted with much chloroform. The separated aqueous phase is adjusted to pH=5 with more citric acid solution, and the mixture is extracted twice more with fresh chloroform. The organic phases are washed twice with water, dried over sodium sulfate and concentrated in vacuo to a small volume. The bulk of N-trityl-tryptophane is precipitated with low-boiling petroleum ether. The precipitate is dried in a high vacuum. Yield: 14.38 grams (98% of theory) of an amorphous product which can be further reacted as it is. M.P. 110–120° C. $[\alpha]_D^{26°} = +29° \pm 1°$ (c.=1.397 in methanol).

EXAMPLE 3

N-Trityl-L-Tryptophylglycine-Para-Nitrobenzyl Ester 1.84 grams (8.75 millimols) of glycine-para-nitrobenzyl ester in 10 cc. of dry acetonitrile are cooled to 0° C., a solution of 2 grams (9.7 millimols) of N:N'-dicyclohexyl-carbodiimide in 8 cc. of acetonitrile is added, and 5 minutes later a cooled solution of 4.3 grams (9.6 millimols) of N-trityl-tryptophane (cf. Example 2) in 10 cc. of acetonitrile is added. Precipitation of urea sets in immediately and ceases after 2 hours. Together with the dicyclohexyl urea, the trityl-dipeptide ester separates out in gelatinous form. Reaction is allowed to take place for 4 hours at 0° C. The solvent is then completely evaporated in vacuo, and to remove any unreacted N:N'-dicyclohexylcarbodiimide the evaporation residue is triturated with much petroleum ether.

Repeated extraction of the reaction mixture with ice-cold methylene chloride and methylene chloride+ether yields 1.7 grams of dicyclohexyl urea.

The methylene chloride extracts are concentrated to a small volume, and the trityl-depeptide ester is precipitated with much low-boiling petroleum ether. Crystallization from 85 cc. of methanol of 95% strength yields 5.3 grams of N-trityl-tryptophylglycine nitrobenzyl ester in the form of fine crystalline needles melting at 169–170° C. $[\alpha]_D = -10° \pm 1°$ (c.=0.95 in methanol).

The mother liquor is evaporated to dryness, and the residue is washed in chloroform successively with ice-cold 10% citric acid, once with ice-cold N-hydrochloric acid, with N-sodium bicarbonate solution and finally with water until neutral. The chloroform phases are dried and evaporated, to yield 1.3 grams of a foamy material which is crystallized from methanol of 95% strength to yield another 500 mg. of trityl-dipeptide ester melting at 165–167° C.

The total yield amounts to 4 grams (=74% of theory).

EXAMPLE 4

N-Carbobenzyloxy-L-Tryptophylglycine Benzyl Ester

A solution of 1 gram (3 millimols) of carbobenzoxy-tryptophane in 20 cc. of dry ethyl acetate is mixed with a solution of 660 mg. (4 millimols) of glycine benzyl ester in 5 cc. of ethyl acetate and finally with 650 mg. (3.15 millimols) of N:N'-dicyclohexylcarbodiimide. After only 15 minutes the dicyclohexyl urea begins to separate out. The reaction is allowed to continue for 16 hours at room temperature, the crystalline urea is filtered off, and the filtrate is treated with 0.1 cc. of glacial acetic acid. The ethyl acetate solution is left to itself for 15 minutes and then washed successively with N-hydrochloric acid, water, 1.4% ammonia solution and again with water until neutral. The organic phases are concentrated to a small volume, low-boiling petroleum ether is added until turbidity sets in, and the whole is kept at 0° C. Carbobenzyloxy-dipeptide ester separates out as a gelatinous product. Addition of further petroleum ether and intensive scratching with repeated heating on a water bath kept at 400° C. yields a white microcrystalline powder.

Yield: 950 mg. (=66% of theory) of carbobenzyloxy-L-tryptophylglycine benzyl ester melting at 117–118° C. $[\alpha]_D^{25} = -19° \pm 1°$ (c.=0.950 in methanol).

EXAMPLE 5

Para-(Para'-Methoxyphenylazo)-Benzyloxy-Carbonyl-L-Tryptophylglycine Benzyl Ester 950 mg. (2 millimols) of MZ-tryptophane—prepared as described in patent application Serial No. 755,404, filed August 18, 1958, by Robert Schwyzer et al.—are dissolved with gentle heating in 20 cc. of absolute ethyl acetate, cooled to room temperature, and then mixed with a solution of 500 mg. (3 millimols) of glycine benzyl ester in 5 cc. of absolute ethyl acetate; 500 mg. (2.1 millimols) of 1-cyclohexyl-3-morpholinyl-ethyl-carbodiimide in 2 cc. of ethyl acetate are then added, and the mixture is kept for 16 hours at room temperature. The ethyl acetate solution is washed in a separating funnel with water, 0.5 N-hydrochloric acid, N-sodium bicarbonate solution and again with water until neutral. The ethyl acetate solution is dried and concentrated to a small volume, and the MZ-dipeptide ester is precipitated with much petroleum ether. Drying in a high vacuum yields 1.2 grams of crude product which is still contaminated with some starting material.

One recrystallization from 30 cc. of hot acetonitrile yields 610 mg. of pure product melting at 152–153° C. Processing of the mother liquor yields another 170 mg. of MZ-dipeptide ester of the same melting point. Total yield: 770 mg. (=63% of theory). M.P. 152–153° C. Ultraviolet spectrum in methanol: maximum at 240 mμ ($\epsilon$=11,000) and at 748 mμ ($\epsilon$=208,000).

EXAMPLE 6

*L-Tryptophylglycine-Para-Nitrobenzyl Ester Hydrochloride*

1.7 grams (2.65 millimols) of N-trityl-tryptophyl-glycine-para-nitrobenzyl ester are dissolved in 10 cc. of glacial acetic acid and detritylated with 1.45 cc. of 2 N-hydrochloric acid for 5 minutes on a water bath at 50° C. The solvent is then evaporated in vacuo at 30° C., and the residue is dried in a high vacuum for 2 hours at 45° C. The triphenylcarbinol is extracted with much ether from the crystalline hydrochloride of L-tryptophylglycine-para-nitrobenzyl ester.

Yield: 1.15 grams (=100% of theory). M.P. (135° C.) 150–153° C.

EXAMPLE 7

*L-Tryptophylglycine Benzyl Ester Hydrobromide*

870 mg. (2 millimols) of carbobenzoxy-tryptophyl-glycine benzyl ester (cf. Example 4) are suspended in 2 cc. of absolute nitromethane and in a nitrogen atmosphere treated with 2 cc. of 4 N-hydrogen bromide solution in glacial acetic acid, whereupon the solution immediately turns violet. The reaction is allowed to continue for 1 hour at room temperature and with the exclusion of light, the surplus hydrogen bromide is evaporated at 30° C., and the hydrobromide of the dipeptide ester is precipitated with much absolute ether. The oily decarbobenzoxylation product solidifies immediately on being triturated with fresh absolute ether. Two reprecipitations from acetone+ether yield 300 mg. (=92% of theory) of a granular, pale-grey product.

The paper chromatogram (secondary butanol:5% veronal sodium:water:isopropanol=100:10:60:15) reveals only one spot of positive ninhydrin reaction.

The hydrobromide can be further used as it is. It is readily soluble in acetone and ethyl ester, but only partially soluble in water.

EXAMPLE 8

*N-Carbobenzyloxy-L-Phenylalanine-L-Arginine Methyl Ester Carbonate*

(1) VIA THE MIXED ANHYDRIDE

A solution of 600 mg. (2 millimols) of carbobenzoxy-phenylalanine in 10 cc. of absolute tetrahydrofuran is mixed at −10° C. with 0.28 cc. (2 millimols) of triethylamine and 5 minutes later at the same temperature with 0.2 cc. (2 millimols) of chloroformic acid ethyl ester. Triethylamine hydrochloride separates out immediately as a white precipitate. To complete the formation of the mixed anhydride the mixture is allowed to react for another 10 minutes at −10° C. and then mixed with a solution, likewise cooled to −10° C., of arginine methyl ester hydrochloride—prepared from 580 mg. (2.2 millimols) of arginine methyl ester dihydrochloride and 0.31 cc. (2.2 millimols) of triethylamine—in 6 cc. of N:N-dimethylformamide. The mixture is stirred for 15 minutes at −10° C. and then for 1 hour at room temperature, and the solution is freed from triethylamine hydrochloride (400 mg.) and evaporated in vacuo at 50° C. The evaporation residue is washed in methylene chloride with water and sodium bicarbonate solution and again with water until neutral, the solution is dried over magnesium sulfate and evaporated to dryness. Yield: 810 mg. (=85% of theory) of crude carbobenzoxy-dipeptide ester in a form sufficiently pure for the decarbobenzoxylation.

When a specimen of the amorphous carbobenzoxy-dipeptide ester is treated with picric acid, a quantitative yield of the picrate is obtained.

The analytically pure product, obtained by two recrystallizations from aqueous methanol, melts at 161–162° C.

(2) BY MEANS OF DICYCLOHEXYLCARBODIIMIDE 4.92 grams (19 millimols) of L-arginine methyl ester dihydrochloride are dissolved in 100 cc. of hot absolute methanol, cooled to −10° C. and converted into the monohydrochloride with 2.64 cc. (19 millimols) of triethylamine. The mixture is treated with 3.9 grams (19 millimols) of N:N'-dicyclohexylcarbodiimide in 15 cc. of absolute methanol and finally, while shaking the reaction vessel well, 5.2 grams (17.1 millimols) of carbobenzoxy-phenylalanine are added in portions at −10° C. The carbobenzoxy-phenylalanine dissolves immediately and after 5 minutes dicyclohexyl urea begins to crystallise out. The whole is kept for 16 hours at 0° C., the urea (2.75 grams=71%) is filtered off, the surplus dicyclohexylcarbodiimide is destroyed with a small amount of acetic acid, and the methanol is evaporated in vacuo. The evaporation residue is taken up in methylene chloride, washed with 2 N-hydrochloric acid, 2 N-sodium bicarbonate solution and then with water until neutral. Two reprecipitations from a mixture of methylene chloride and petroleum ether yield 2.47 grams (=87% of theory) of amorphous carbobenzoxy-dipeptide ester which is decarbobenzoxylated as it is.

EXAMPLE 9

*Para-(Para'-Methoxyphenylazo)-Benzyloxy-Carbonyl-L-Phenylanyl-L-Arginine Methyl Ester Hydrochloride*

A solution of 8.66 grams (20 millimols) of MZ-phenyl-alanine—prepared as described in patent application Serial No. 755,404, filed August 18, 1958, by Robert Schwyzer et al.—in 150 cc. of absolute tetrahydrofuran is mixed at −10° C. with 2.8 cc. (20 millimols) of triethylamine and 10 minutes later at the same temperature with 2.0 cc. (20 millimols) of chloroformic acid ethyl ester. After another 15 minutes a cooled solution is added of arginine methyl ester hydrochloride prepared from 5.8 grams (22 millimols) of arginine methyl ester dihydrochloride and 3.06 cc. (22 millimols) of triethylamine in 30 cc. of dimethylformamide. The mixture is allowed to react for 30 minutes at −10° C. and then for 1 hour at room temperature, the triethylamine hydrochloride (5.2 grams) is filtered off, and the solvent is evaporated in vacuo at 50° C. The residue is treated with much ether, decanted, the oily product is dried in vacuo and triturated with much water, whereupon the crude MZ-compound solidifies. The aqueous phase is centrifuged, the residue kneaded twice with 50 cc. of fresh water on each occasion and lyophilized. Yield: 11.7 grams of crude product.

The above 11.7 grams of crude product are dissolved in 70 cc. of ethanol of 95% strength, poured over an alumia column (23 cm. long, 5 cm. diameter) and elutriated with much alcohol of 95% strength. After a small preliminary fraction (110 mg.), 5.05 grams of MZ-dipeptide ester hydrochloride crystallise from the alcoholic solution M.P. 185–186° C.

The mother liquor yields another 3.36 grams of pure substance melting at 184–185° C. Total yield: 8.41 grams (=66% of theory).

The sulfate (M.P. 145–146° C.) can be obtained in quantitative yield by adding a 1:1 dilution of sulfuric acid to an alcoholic solution of MZ-phenylalanyl-arginine methyl ester hydrochloride.

EXAMPLE 10

*L-Phenylalanyl-L-Arginine Methyl Ester Hydrobromide, Hydrochloride*

2.5 grams (3.9 millimols) of MZ-phenylalanyl-arginine methyl ester hydrochloride (cf. Example 9) are dissolved in 6 cc. of nitro-methane, treated with 6 cc. of 4 N-hydrogen bromide (24 millimols) in glacial acetic acid and the mixture is kept for 90 minutes at room temperature. Towards the end of the reaction time para-(para'-methoxyphenylazo)-benzylbromide crystallizes from the reaction solution in magnificent red flakes. The hydrogen bromide and the bulk of the solvent are evaporated in vacuo, and the residue is triturated three times with absolute ether. The crude decarbobenzoxylation product is then distributed between much chloroform and water. The aqueous and chloroformic phases are each extracted once more with fresh solvent, the aqueous extracts are combined and evaporated to dryness in vacuo at 40° C.

The hydrobromide, hydrochloride of phenylalanyl-arginine methyl ester precipitates as a pale-red amorphous product which is used for the subsequent condensation as it is. Yield: 1.4 grams (=80% of theory).

When carbobenzoxy-phenylalanyl-arginine methyl ester carbonate (Example 8) is decarbobenzoxylated under identical conditions, a dihydrobromide is obtained whose paper chromatogram is identical with that of the hydrochloride, hydrobromide described above.

EXAMPLE 11

Nα-Carbobenzyloxy-(N)-Im-Benzyl-L-Histidyl-L-Phenylalanyl-L-Arginine Methyl Ester Carbonate A solution of 5.32 grams (0.014 mol) of Nα-carbobenzoxy-N(im)-histidine in 110 cc. of dimethylformamide is mixed at 15° C. with a solution of 3.02 grams (0.0147 mol) of N:N'-dicyclohexylcarbodiimide in 5 cc. of dimethyl formamide.

Concurrently 7.7 grams (0.0154 mol) of phenylalanyl-arginine methyl ester dihydrobromide (cf. Example 10) in 20 cc. of dimethyl formamide are converted into the monohydrobromide with 2.15 cc. (0.0154 mol) of triethylamine, the whole is cooled to 0° C., and added to the above solution of Nα-carbobenzoxy-N(im)-benzylhistidine.

After the mixture has been kept for 20 hours, the dicyclohexyl urea (2.27 grams=74%) is filtered off, the filtrate treated with 0.6 cc. of glacial acetic acid and after 15 minutes the solution is concentrated to a small volume, again freed from the crystalline salt and then evaporated to complete dryness. The amorphous residue is treated with much ether and then dried for 4 hours at 50° C.

The pulverulent crude product is triturated in the cold three times wtih 40 cc. on each occasion and once with 30 cc. of 0.5 N-ammonium hydroxide solution, the supernatant solution being thoroughly removed by centrifugation in each case and the residue taken up in 100 cc. of a 1:1 mixture of butanol and chloroform. The solution is rendered acid to Congo with twice 20 cc. of 2 N-hydrochloric acid and then washed with 2 N-sodium bicarbonate solution and finally with water until neutral.

The extracts are dried and evaporated to dryness in vacuo. The evaporation residue is dissolved in 135 cc. of 0.25 N-hydrochloric acid, filtered and adjusted to pH=7–8 with 2 N-sodium bicarbonate solution while being cooled with ice.

The separated carbobenzoxy-tripeptide ester is again taken up in a 1:1 mixture of butanol and chloroform, washed with water until neutral, dried over sodium sulfate, and the butanol+chloroform mixture is concentrated to a small volume. Two reprecipitations from chloroform+petroleum ether yield 7.16 grams (=70% of theory) of Nα-carbobenzoxy-N(im)-benzylhistidyl-phenylalanyl-arginine methyl ester carbonate.

For analysis the product is recrystallized twice from 50% methanol, when it melts at 131–135° C. $[\alpha]_D^{25}=-13°\pm1°$ (c.=0.7822 in methanol).

EXAMPLE 12

Nα-Carbobenzyloxy-N(Im)-Benzyl-L-Histidyl-L-Phenylalanyl-L-Arginine 6.52 grams (8.9 millimols) of carbobenzoxy-(im)-benzyl-histidyl-phenylalanyl-arginine methyl ester carbonate (cf. Example 11) in 50 cc. of methanol are hydrolyzed with 19.5 cc. of N-sodium hydroxide solution for 1 hour at room temperature, adjusted with N-hydrochloric acid to pH=6, and 300 cc. of water are added to the hydrolyzed product. The whole is left to itself for 1 hours at 0° C., the carbobenzoxy-tripeptide is filtered off and while still moist crystallized from 50% methanol. Yield: 4.27 grams (=70% of theory). M.P. 136–139° C. $[\alpha]_D^{25}=-10.5°\pm0.9°$ (c.=1.062 in methanol).

According to its micro-analysis the carbobenzoxy-tripeptide crystallizes with 1 mol of water.

EXAMPLE 13

Nα - Carbobenzyloxy - N(Im) - Benzyl - L - Hystidyl - L - Phenylalanyl - L - Arginyl - L - Tryptophylglycine-Para-Nitrobenzyl Ester Carbonate 4.2 grams (6 millimols) of carbobenzoxy-(im)-benzyl-histidyl-phenylalanyl-arginine (cf. Example 12) and 2.87 grams (6.6 millimols) of L-tryptophylglycine-para-nitrobenzyl ester hydrochloride (cf. Example 6) are dissolved in 20 cc. of freshly distilled N:N-dimethyl formamide and mixed, while being cooled with ice, with a solution of 1.35 grams (6 millimols) of N:N'-dicyclohexyl-carbodiimide in 7 cc. of dimethyl formamide. The reaction mixture is kept for 24 hours at room temperature, the dicyclohexyl urea (890 mg.=67%) is filtered off, and the solvent is evaporated in vacuo, to yield 8.3 grams of crude product contaminated with some dicyclohexyl urea.

6.3 grams of the crude product are distributed between 500 cc. of ethyl acetate and 50 cc. of N-sodium bicarbonate solution, the ethyl acetate phases are washed with water, 5 times with 10% acetic acid solution on each occasion, then repeatedly with N- and 2 N-sodium bicarbonate solution and finally with water until neutral.

When the ethyl acetate solution is dried and evaporated, part of the product crystallizes out again from the solvent. Addition of low-boiling petroleum ether completes the precipitation of the carbobenzoxy-pentapeptide ester in a yield of 4.6 grams.

For further purification 3.5 grams of the product are chromatographed over 100 grams of alumina of activity III. Elution with methanol yields 2.78 grams of carbobenzoxy-pentapeptide ester which is decarbobenzoxylated at it is.

EXAMPLE 14

N(Im) - Benzyl - L - Histidyl - L - Phenylalanyl - L - Arginyl - L - Tryptophylglycine-Para-Nitrobenzyl Ester Trihydrobromide 1.75 grams (1.67 milimols) of carbobenzoxy-(im)-benzyl - L-histidyl-L-phenylalanyl-L-arginyl-L-tryptophyl-glycine-para-nitrobenzyl ester carbonate (cf. Example 13) are decarbobenzoxylated with 5 cc. of 2 N-hydrogen bromide in glacial acetic acid for 1 hour at room temperature. The surplus hydrogen bromide is suctioned off at room temperature in vacuo and the residue is repeatedly triturated with much absolute ether.

The crude decarbobenzoxylation product is subjected to a multiplicative distribution according to Craig over 85 stages with 0.3 N-ammonium acetate solution (pH 7.1) as the lower phase and n-butanol as the upper phase. The bulk of the substance is contained in the fractions 73 to 85. These fractions are combined, separated from the lower phase, the latter is again extracted with fresh butanol, the combined butanolic extracts are concentrated in vacuo to a small volume, and the free pentapeptide ester is precipitated with much petroleum ether. Repeated reprecipitation from chloroform+petroleum ether yields 1.2 grams of paper-chromatographically pure (im)-benzyl - L-histidyl-L-phenylalanyl-L-arginyl-L-tryptophyl-glycine-para-nitrobenzyl ester.

EXAMPLE 15

N - Carbobenzyloxy - γ - Benzyl - L - Glutamyl - (Im)-Benzyl - L - Histidyl - L - Phenylalanyl - L - Arginyl-L-tryptophylglycine-Para-Nitrobenzyl Ester Carbonate A solution of 370 mg. (1 millimol) of N-carbobenzoxy-glutamic acid-γ-benzyl ester in 10 cc. of absolute dioxane is mixed at 10–11° C. (part of the dioxane is always frozen) with 0.26 cc. (1.1 millimols) of tributylamine and 10 minutes later at the same temperature with 0.11 cc. (1.1 millimols) of chloroformic acid ethyl ester. To complete the formation of the mixed anhydride, the mixture is allowed to react for 20 minutes at the stated temperature, and 820 mg. of (im)-benzyl-pentapeptide nitrobenzyl ester according to Example 14 in a mixture of acetonitrile and dioxane (10 cc.) are added. The whole is kept for 30 minutes in an ice bath and then for 60 minutes at room temperature, then evaporated to dryness. The residue is taken up in chloroform and the solution washed with ice-cold N-hydrochloric acid, N-sodium bicarbonate solution and finally with water until neutral. The chloroform extract is dried and evaporated in vacuo, and the carbobenzoxy-hexapeptide ester (1 g.=90%) still contaminated with some starting material is precipitated with petroleum ether.

200 mg. of the crude product in absolute chloroform are poured over a column of alumina of activity III. The bulk (160 mg.) can be eluted again with methanol, and these eluates are distributed multiplicatively according to Craig over 30 stages between methanol of 80% strength and a 1:1 mixture of chloroform and carbon tetrachloride. G=4.65.

The bulk of the substance is contained in fractions 19–30. These fractions are combined, the solvent mixture is evaporated, and the evaporation residue is further reacted.

EXAMPLE 16

*L-Glutamyl-L-Histidyl-L-Phenylalanyl-L-Arginyl-L-Tryptophylglycine*

(1) 350 mg. (0.37 millimol) of carbobenzoxy-hexapeptide ester according to Example 15 purified over alumina are decarbobenzoxylated with 1.1 cc. of 2 N-hydrogen bromide in glacial acetic acid for 1 hour at room temperature. The surplus hydrogen bromide is removed in vacuo, and the trihydrobromide is precipitated with much absolute ether. Repeated trituration with fresh ether yields a granular, pale grey powder.

Yield: 550 mg. of crude hexapeptide ester trihydrobromide.

This product is distributed over 30 stages between 0.3 N-ammonium acetate (pH=7.5) and n-butanol. The fractions 25–30 are combined, and the lower phases are again extracted with fresh butanol. Evaporation of the butanol produces 280 mg. of γ-benzyl-glutamyl-(im)-benzyl - histidyl - phenylalanyl - arginyl-tryptophylglycine nitrobenzyl ester which is hydrogenated in acetic acid of 90% strength in the presence of 10% palladium carbon catalyst.

After 17½ hours the hydrogenation comes to a standstill, by which time 21 cc. of hydrogen have been taken up. The solution is freed from the catalyst and evaporated to dryness at 40° C. The evaporation residue is taken up in a small amount of alcohol of 95% strength, and the hydrogenated product is precipitated with much ether. Yield: 190 mg.

Paper-chromatographic examination reveals that there are still some unhydrogenated compounds present.

The 190 mg. of Glu-(im) Bz-His-Phe-Arg-Try-Gly are added to 50 cc. of dry, freshly condensed ammonia. While stirring well with a magnetic stirrer, small pieces of shiny sodium are slowly added to the suspension. A clear solution can be obtained only when sodium is added. When 2.25 millimols of sodium have been added, the solution retains its dark blue color for some length of time.

3 grams of Dowex-50 (proprietary synthetic ion-exchange resin) in the ammonium form are added in small portions to the reaction solution, whereupon discoloration sets in immediately. The ammonia is evaporated with vigorous stirring and with the exclusion of moisture at room temperature. The last phase of ammonia is evaporated in a high vacuum over sulfuric acid.

The Dowex is extracted four times with 10 cc. of water, the colorless aqueous solution (pH=9) is acidified with 0.5 cc. of glacial acetic acid and evaporated to dryness. The residue is repeatedly evaporated with absolute ethanol, dissolved in 5 cc. of water, the impurities are filtered off, and the filtrate is again evaporated to dryness.

The hexapeptide is triturated with 10 cc. of absolute alcohol, the mother liquor centrifuged and the residue dried in a high vacuum.

44 mg. of hexapeptide are obtained as a white powder. In the animal test this hexapeptide displays MSH-activity.

(2) 124 mg. (0.1 millimol) of N-carbobenzoxy-γ-benzyl - L - glutamyl - (im) - benzyl-L-histidyl-L-phenylalanyl-L-arginyl-L-tryptophylglycine nitrobenzyl ester are split directly with 1.2 millimols of sodium in 30 cc. of liquid ammonia. Working up as described above produces 25 mg. of hexapeptide which by paper-chromatography is revealed to be identical with the product obtained in the first experiment.

EXAMPLE 17

*L-Phenylalanyl-Nitro-L-Arginine-Methyl Ester*

25.14 grams (0.049 mol) of carbobenzoxy-L-phenylalanyl-nitro-L-arginine-methyl ester [cf. K. Hofmann et el., J.A.C.S. vol. 78, 240 (1945)] are dissolved with slight heating in 50 cc. of glacial acetic acid and decarbobenzoxylated for 90 minutes at room temperature with 50 cc. of 4 N-hydrogen bromide in glacial acetic acid.

Under reduced pressure and at 40° C., the reaction solution is evaporated down to a small volume and the syrupy residue is introduced into 1 liter of absolute ether while stirring vigorously. After stirring for 15 minutes, the flocky precipitate is allowed to settle and the residue is dried at 40° C. over phosphorus pentoxide in vacuo.

The crude hydrobromide is taken up in 40 cc. of ice-cold water, the solution is cooled with ice and rendered alkaline to phenolphthalein with 2 N-sodium carbonate solution, and extracted first 3 times with 100 cc. of ether each time—to remove impurities—then with 200 cc., 100 cc. and 50 cc. of a mixture of N-butanol+chloroform 1:9. The chloroform+butanol extracts are washed twice with 10 cc. of half-saturated sodium chloride solution each time and finally dried with magnesium sulfate. Under reduced pressure the chloroform and part of the butanol are evaporated at 40–45° C., and the free peptide ester is then precipitated with much ether. It is then filtered through a fine glass filter, washed with a large quantity of ether and the residue dried in a high vacuum at 40° C.

The yield is 16 grams of amorphous L-phenylalanine-nitro-L-arginine-methyl ester, that is to say, 71% of the theoretical yield.

In the three phases

43: tertiary-amylalcohol:isopropanol:water=100:40:55,
54: secondary butanol : isopropanol : monochloracetic acid:water=70:10:3 g.:40,
56: secondary butanol:isopropanol:5% aqueous veronal-sodium solution:water=100:15:10:60 the dipeptide ester exhibits only one ninhydrine-positive spot.

The amorphous product is used for further reaction without additional purification.

EXAMPLE 18

*Nα,N(Im)-Dicarbobenzyloxy-L-Histidyl-L-Phenylalanyl-Nitro-L-Arginine-Methyl Ester*

16 grams (0.042 mol) of L-phenylalanyl-nitro-L-arginine-methyl ester (cf. Example 17) in 50 cc. of acetonitrile are cooled to −10° C. and combined with the pre-cooled solution of 19.2 grams of dicarbobenzoxy-L-histidine (0.042 mol) in 140 cc. of acetonitrile, part of the solute separating out. On addition of 10 cc. of dimethylformamide and vigorous shaking the solution is clear again. There is then introduced the pre-cooled solution of 9.7 g. of dicyclohexyl-carbodiimide (0.047 mol) in 45 cc. of acetonitrile, and the reaction allowed to proceed at 0 to +3° C. After a short while dicyclohexylurea begins to separate in addition to dicarbobenzoxy-dipeptide ester. The reaction mixture is diluted with 100 cc. of acetonitrile+dimethyl formamide 9:1 and allowed to stand at 0° C. overnight. The compact jelly, partly crystalline cake is triturated well with another 100 cc. of acetonitrile, filtered through a fritted glass filter G 2, and washed well with twice 50 cc. of acetonitrile.

To the mother liquor is added 0.5 cc. of glacial acetic acid, the mixture allowed to react for 15 minutes, and then evaporated to dryness. The minor amount of residue is contaminated with starting material is not worked up any further.

To the moist filter residue is added a total of 60 cc. of dimethyl formamide and in this manner there are separated 9.3 grams of insoluble dicyclohexyl urea (=98% of the theoretical yield). The melting point is at 226–228° C.

The dimethyl formamide solution is evaporated to dryness in a high vacuum at 40° C. and 26.7 g. of crude material obtained.

After one recrystallization from 100 cc. of methanol there are obtained 23.1 g. (=70% of the theoretical yield) of dicarbobenzoxy-tripeptide ester.

The compound crystallizes with 1 mol of methanol. Melting point 125–128° C. $[\alpha]_D^{26}=-19°\pm1.5°$ (c.=0.9787 in methanol). The dicarbobenzoxy compounds are extremely sensitive to bases.

EXAMPLE 19

*L-Histidyl-L-Phenylalanyl-L-Arginine-Methyl Ester-Diacetate*

16.5 grams (20 millimols) of dicarbobenzoxy-L-histidyl-L-phenylalanyl-nitro-L-arginine-methyl ester (cf. Example 18) are hydrogenated to saturation in 300 cc. of absolute methanol with the addition of 4.4 equivalents of methanolic hydrochloric acid in the presence of 4 g. of 10% palladium carbon catalyst. The carbon dioxide formed is adsorbed with potassium hydroxide solution in a second intermediate hydrogenating vessel. After 10 hours 2515 cc. of the calculated 2700 cc. of hydrogen are absorbed and the hydrogenation is complete. The solution is freed from the catalyst and evaporated at 40° C. in vacuo. The residue is dissolved in 20 cc. of water and the solution run slowly through an ion exchange column charged with 120 cc. of Amberlite IR-4B (registered trademark) (acetate form). Washing with water follows until the eluates no longer give a ninhydrin-positive reaction. A total of 360 cc. of water is used for washing.

The aqueous solution is evaporated to dryness at 40° C. in vacuo, and the well-dried residue precipitated from the methanolic solution with absolute ether. The yield is 13.1 g. of amorphous tripeptide ester-diacetate.

In paper-chromatography the tripeptide ester shows in the two systems 56 (cf. column 10) and secondary butanol:isopropanol:triethylamine : veronal : water=100:10:0.8:1.8 g.:60 only one ninhydrin-, Pauly- and Sakaguchi-positive spot. The amorphous product is worked up as it is.

EXAMPLE 20

*N-Carbobenzyloxy-L-Glutaminyl-L-Histidyl-L-Phenylalanyl-L-Arginine-Methyl Ester*

13.1 grams (22 millimols) of L-histidyl-L-phenylalanyl-L-arginine-methyl ester-diacetate (cf. Example 19) in 60 cc. of dimethyl formamide are cooled to —10° C. and treated with 6.1 g. of carbobenzoxy-L-glutaminazide (20 millimols) in portions, the azide dissolving immediately. The reaction is allowed to proceed for 2 days at 0° C. and the crude tetrapeptide ester is then precipitated with 1 liter of ethyl acetate. The jelly-like precipitate is filtered off and washed with much ethyl acetate and ether.

One recrystallization from methanol+ethyl acetate yields 11.3 g. of paper-chromatographically pure carbobenzoxy-tetrapeptide-methyl ester of melting point 162–165° C. (sintering at 155° C.).

For analysis the product is crystallized once more from the same mixture of solvents, when it melts at 167–169° C.

The distribution coefficient in the system 80% methanol:(chloroform:carbon tetrachloride=1:1)=1:1 is 5.9; $[\alpha]_D^{24}=-18.4°\pm1.6°$ (c.=0.979 in glacial acetic acid) The $R_f$ values in the systems 54, 56 (cf. column 10) and methyl ethyl ketone:pyridine:water=60:15:25 are 0.59, 0.82, and 0.85, respectively.

EXAMPLE 21

*N-Carbobenzyloxy-L-Glutaminyl-L-Histidyl-L-Phenylalanyl-L-Arginine*

2.5 grams (3.1 millimols) of carbobenzoxy-tetrapeptide ester-acetate according to Example 20 are dissolved with heating in 80 cc. of ethanol+water 3:5 and treated at room temperature with 6.5 cc. of N-sodium hydroxide solution. After 10 minutes the solution becomes turbid and a jelly substance begins to separate. During hydrolysis, which takes 60 minutes, the pH is 11.5. The solution is rendered neutral with 6.5 cc. of N-hydrochloric acid and evaporated to dryness at 40° C. The jelly residue is taken up in 50 cc. of hot water, filtered through cotton, the solution concentrated to a volume of 20 cc. and allowed to stand for 16 hours at 0° C.

The jelly precipitate is carefully filtered through a fritted glass filter G 2, washed with a small amount of ice-cold water, and dried over phosphorus pentoxide under reduced pressure.

The yield is 1.65 g.=75% of the theory. Melting point, 167–169° C. (sintering at 165° C.).

For analysis, the product is recrystallized from water, dried in a high vacuum, and then allowed to stand in the air, when it has the content of 4 mols of water of crystallization. Melting point, 159–160° C.

The distribution coefficient in the system n-butanol:1% glacial acetic acid=1:1 is 0.16. $[\alpha]_D^{26}=33.6°\pm1.3°$ (c.=0.923 in N-hydrochloric acid).

A test portion of the pure carbobenzoxy-tetra-peptide ester decarbobenzoxylated with 2 N-hydrogen bromide in glacial acetic acid can be split into the 4 amino acids with leucinamino-peptidase under standard conditions.

EXAMPLE 22

*N-Carbobenzyloxy-L-Glutaminyl-L-Histidine-Methyl Ester*

(A) WITH DICYCLOHEXYL-CARBODIIMIDE 15.1 grams (0.054 mol) of carbobenzoxy-L-glutamine are disolved in a mixture of 18 cc. of dimethylformamide and 81 cc. of acetonitrile, the whole is cooled to 0° C. and treated with a pre-cooled solution of 9.81 g. of histidine-methyl ester (0.058 mol) in 9 cc. of dimethyl formamide and 36 cc. of acetonitrile, part of the solute separating out. On addition of another 20 cc. of dimethylformamide the solution becomes clear again. There are then added 12.2 grams (0.059 mol) of dicyclohexylcarbodiimide in 13 cc. of dimethyl formamide and the whole allowed to react at 0° C. overnight. Apart from the urea, the carbobenzoxydipeptide ester separates in the form of a jelly precipitate. The jelly, partly crystalline precipitate is filtered off, washed well with acetonitrile and dried in a high vacuum. The mixture of carbobenzoxy-dipeptide ester and dicyclohexylurea is slurried in 35 cc. of 2 N-hydrochloric acid, filtered with suction to remove the insoluble urea, and washed with 11 cc. of 2 N-hydrochloric acid. The hydrochloric acid solution is neutralized with the calculated quantity of N-sodium hydroxide solution, the carbobenzoxydipeptide ester separating in the form of a thick jelly which is diluted with 150 cc. of water, well kneaded and filtered through a fritted glass filter G 2. For complete neutralization the filter residue is combined with the filtrate which has an alkaline reaction, and the whole is kneaded well once more (pH of the filtrate=8). After drying there are obtained 14.5 g. of protected dipeptide ester (63% of the theoretical yield). Melting point, 167–169° C.

For analysis a fraction is recrystallized from water. It melts at 171–174° C.; $[\alpha]_D^{24}=-32.4°\pm0.6°$ (c.=1.17 in N-hydrochloric acid).

From the mother liquor another 2.4 g. of paper-chromatographically pure carbobenzoxy-dipeptide ester of melting point 158° C. can be obtained. In this fraction, the halogen test is positive.

(B) WITH N,N'-DIIMIDAZOLE-CARBONYL 140 cc. (0.5 millimol) of carbobenzoxy-L-glutamine (dried over phosphorus pentoxide) are dissolved in 1.5 cc. of freshly distilled dimethylformamide and treated with 97 mg. (0.6 millimol) of diimidazole-carbonyl with exclusion of moisture. As soon as the evolution of carbon dioxide ceases, a solution of 85 cc. of histidine methyl ester (0.5 millimol) in 1 cc. of dimethylformamide is added and the whole allowed to react overnight at 0° C.

The protected dipeptide ester is precipitated with much ether. After drying, the yield is 190 mg. (=88% of the theoretical yield) of carbobenzoxy-L-glutaminyl-L-histidine-methyl ester. Melting point, 170–173° C., with decompostion: $[\alpha]_D^{23}=-32.2°\pm1.1°$ (c.=1.025 in N-hydrochloric acid).

EXAMPLE 23

*N-Carbobenzyloxy-L-Glutaminyl-L-Histidine*

5.9 grams of carbobenzoxy-L-glutaminyl-L-histidine-methyl ester (cf. Example 22) are dissolved in a mixture of 42 cc. of methanol and 28 cc. of water with heating, then cooled to room temperature, and treated with 35.5 cc. of 0.45 N-barium hydroxide solution. After 5 minutes the barium salt begins to separate as a thick white precipitate. The mixture is diluted with 140 cc. of water, stirred with a magnetic stirrer, and allowed to hydrolyze for 45 minutes. The solution is neutralized with the calculated quantity of N-sulfuric acid (15 cc.). The barium sulfate is removed by filtration and the solution evaporated to dryness. The glassy residue is taken up in a small amount of dimethyl formamide, the solution filtered through a fritted glass filter G 4 and the carbobenzoxy-dipeptide precipitated with a large quantity of ethyl acetate.

After drying in a high vacuum, 5.72 grams of amorphous paper-chromatographically pure carbobenzoxy-dipeptide are obtained.

Crystallization from methanol yields 5.1 grams of carbobenzoxy-L-glutaminyl-L-histidine melting at 196–197° C.

The distribution coefficient in the system 80% methanol: (chloroform:carbon, tetrachloride=1:1)=1:1 is 4.6.

EXAMPLE 24

*p-(p'-Methoxyphenylazo)-Benzyloxycarbonyl-L-Glutamine (MZ-L-Glutamine)*

11.7 grams (51 millimols) of L-glutamine-hydrobromide (obtained by decarbobenzoxylation of the corresponding carbobenzoxy compound) are dissolved in 75 cc. of water, diluted with 200 cc. of acetone, and treated with 5 g. of magnesium oxide (20% excess). After that, there are added in small portions in the course of 1 hour at 0° C. 17 grams of p-(p'-methoxyphenylazo)-benzyloxycarbonyl chloride (56 millimols), the whole diluted with 200 cc. of water, and stirred for another 90 minutes at room temperature. The reaction mixture is rendered acid to Congo red with 2 N-hydrochloric acid and allowed to stand at room temperature for 2 hours. The jelly residue is separated by centrifuging and dried at 50° C. under reduced pressure.

The crude product is crystallized from 500 cc. of 95% methanol and then melts at 183–184° C. The yield is 13.48 g.

From the mother liquor another 2.56 g. of material melting at 183–184° C. can be isolated.

The total yield thus amounts to 16.04 g. or 76.3% of the theoretical yield.

The ultraviolet spectrum shows: $\lambda$ max. 237 m$\mu$ ($\epsilon$=13,100) and $\lambda$ max. 349 m$\mu$ $\epsilon$=2,600).

EXAMPLE 25

*p-(p'-Methoxyphenylazo)-Benzyloxycarbonyl-L-Glutaminyl-L-Histidine-Methyl Ester*

2.86 grams of MZ-glutamine (6.9 millimols) (cf. Example 24) are dissolved in 10 cc. of dimethylformamide and the solution treated with a solution of 1.3 g. of L-histidine-methyl ester (7.8 millimols) in 15 cc. of dimethylfomramide. The mixture is allowed to react overnight at 0° C. The urea is filtered off, the unreacted carbodiimide is admixed with 3 drops of glacial acetic acid, and the dimethylformamide evaporated to dryness under reduced pressure. The residue is triturated with much ethyl acetate and allowed to stand at 0° C. for 2 days, then filtered, and the orange-red product dried at 40° C. under reduced pressure. The yield is 2.8 g. of crude product.

For purification, 2.5 g. of crude product are dissolved in 10 cc. of secondary butanol saturated with water and filtered through a column of alumina.

2.3 grams of pure MZ-dipeptide ester can be eluated, whereas the unreacted MZ-L-glutamine remains behind forming an orange-red zone at the top of the alumina column.

After reprecipitation from 90% ethanol the preparation melts at 167–169° C.

The ultraviolet spectrum shows: $\lambda$ max. 237 m$\mu$ ($\epsilon$=12,700), $\lambda$ max. 340 m$\mu$ ($\epsilon$=21,200) and $\lambda$ max. 435 m$\mu$ ($\epsilon$=2,000).

EXAMPLE 26

*p-(p'-Methoxyphenylazo)-Benzyloxy-Carbonyl-L-Glutaminyl-L-Histidine*

1.13 grams (2 millimols) of MZ-dipeptide ester according to Example 25 are dissolved in 30 cc. of 75% dioxane and the solution hydrolyzed with 2.4 cc. of N-sodium hydroxide solution, adding 10 cc. of water after the first 10 minutes. After 60 minutes there are added, while cooling, 30 cc. of 10% acetic acid and the solvent is evaporated under reduced pressure. The jelly residue is dried quickly at 50° C. and triturated with 100 cc. of water. The mother liquor is eliminated by centrifuging, the solid residue washed well with water and lyophilized. The yield is 750 mg. (68%). To remove the adhering impurities, the MZ-dipeptide is washed with 50% methanol and finally with a large quantity of ether. There remain 670 mg. Melting point, 207–208° C.

For analysis the product is crystallized once from 75% dioxane and then melts at 214–215° C.

EXAMPLE 27

*N-Carbobenzyloxy-L-Phenylalanyl-Nitro-L-Arginyl-L-Tryptophylglycine-Methyl Ester*

8 grams (0.016 mol) of carbobenzoxy-L-phenylalanyl-nitro-L-arginine [cf. K. Hofmann et al., J.A.C.S. vol. 78, 240 (1956)] are dissolved with heating in a mixture of 8 cc. of dimethyl formamide and 45 cc. of acetonitrile, then cooled to 0° C. and treated with a pre-cooled solution of 5.71 grams (0.02 mol) of L-tryptophyl-glycine-methyl ester in 4.5 cc. of dimethyl formamide and 18 cc. of acetonitrile. The whole is diluted with 45 cc. of acetonitrile and stirring continued for 15 minutes. At 0° C., 4.1 grams (0.02 mol) of dicyclohexylcarbodiimide in 9 cc. of acetonitrile are introduced and the whole allowed to stand for 24 hours at this temperature. The precipitated urea (3.22 grams) is filtered off, the solution treated with 0.5 cc. of glacial acetic acid and, after having been allowed to stand for 15 minutes, evaporated to dryness. The oily residue is dissolved in ethyl acetate, the separated urea filtered off, and the organic phases washed neutral 3 times with N-hydrochloric acid, twice with water, then 3 times with N-sodium bicarbonate and finally with water.

During the washing with bicarbonate, 1.45 grams of jelly material separate. Its melting point is identical with that of carbobenzoxy-tetrapeptide ester.

The ethyl acetate phases are dried over sodium sulfate and evaporated to dryness. After one crystallization from much ethyl acetate 7.97 grams of protected tetrapeptide ester of melting point 126–130° C. are obtained. The total yield is 9.42 grams=78% of the theoretical yield.

For analysis the preparation is subjected to another crystallization from ethyl acetate at 126–130° C. and then melts at 126–130° C. $[\alpha]_D^{28} = -18.5°$ C. ±0.5° (c.=1.336 in methanol).

The distribution coefficient G in the system 80% methanol:(chloroform:carbon tetrachloride=1:1)=1:1 is 1.2.

When the same substance is crystallized from different solvents, the melting points are different e.g. from methanol it is 136–140° C.

EXAMPLE 28

*L-Phenylalanyl-L-Arginyl-L-Tryptophyl-Glycine-Methyl Ester-Dihydrochloride*

7 grams (9.2 millimols) of carbobenxoxytetrapeptide ester according to Example 27 are hydrogenated to saturation in 180 cc. of ethanol with the addition of 5 equivalents of methanolic hydrochloric acid in the presence of 2 grams of 10% palladium charcoal as catalyst. The carbon dioxide formed is adsorbed in a second intermediate hydrogenation vessel. After 12 hours the hydrogenation ceases. A total of 997 cc. of hydrogen are consumed (theory, 1035 cc.). The catalyst is filtered off and the solvent evaporated to dryness. The evaporation residue is taken up in 15 cc. of absolute methanol and the product precipitated with a large amount of absolute ether.

The yield of crude dihydrochloride of the tetrapeptide ester is 6.68 grams.

The product contains ammonium chloride, but is sufficiently pure and is used as it is for the reaction to form the carbobenzoxy-hexapeptide ester.

EXAMPLE 29

*N - Carbobenzyloxy - L - Glutaminyl - L - Histidyl - L - Phenylalanyl - L - Arginyl - L - Tryptophyl - Glycine - Nitrobenzyl Ester*

2.0 grams (2.5 millimols) of carbobenzoxy-L-glutaminyl-L-histidyl-L-phenylalanyl-L-arginine. $4H_2O$ (cf. Example 21) are dissolved with heating in 45 cc. of dimethyl formamide, cooled to room temperature, and treated with 1.93 grams (4.5 millimols) of L-tryptophyl-glycine-nitrobenzyl ester (cf. Example 6). The mixture is stirred with a magnetic stirrer for 50 minutes, the greater part of the suspension dissolving. The reaction mixture is then cooled in an ice bath to 0° C., a cooled solution of 620 mg. of dicyclohexyl-carbodiimide (13 millimols) in 5 cc. of dimethyl formamide is added, and the mixture allowed to react for 3 days at 0° C.

The reaction solution is freed from urea (370 mg.=66%), treated with 3 drops of glacial acetic acid, and the dimethyl formamide evaporated to a small volume in a high vacuum. The crude reaction product is precipitated with much ethyl acetate, filtered and dried in a high vacuum over phosphorus pentoxide.

The yield of crude product is 3.1 grams. To remove unreacted starting material, the crude product is distributed between n-butanol and 1% acetic acid (1:1) over 30 stages.

The fractions 0–8 (730 mg.) are mainly carbobenzoxy-tetrapeptide, whereas in fractions 10–26 there is L-tryptophyl-glycine-nitrobenzyl ester in addition to the carbobenzoxy-hexapeptide-nitrobenzyl ester.

For further purification, the fractions 10–26 are distributed again between n-butanol and 1% acetic acid over 40 stages, and the fractions 16–19, 20–23, 24–27, and 28–31 are combined. The fractions 12–15 still contain a little carbobenzoxy-tetrapeptide, whereas in the paper-chromatogram the others show only carbobenzoxy-hexapeptide-nitrobenzyl ester.

The yield of combined fractions is 1.4 grams (50% of the theory).

The distribution coefficient of the analytically pure compound is 1. $[\alpha]_D^{25} = -27.3° \pm 1.4°$ (c.=1.064 in dimethyl formamide).

EXAMPLE 30

*N - Carbobenzyloxy - L - Glutaminyl - L - Histidyl - L - Phenylalanyl - L - Arginyl - L - Tryptophyl - Glycine - Methyl Ester Hydrochloride*

(A) FROM CBO-GLU.($NH_2$)-HIS-PHE-ARG.OH+H-TRY-GLY.OCH₃HCl 5 grams (6.25 millimols) of carbobenzoxy-tetrapeptide (cf. Example 21) are dissolved with heating in a mixture of 70 cc. of dimethyl-formamide and 15 cc. of diethylphosphate. The solution is cooled to room temperature and then treated with 3.7 grams (12 millimols) of L-tryptophyl-glycine-methyl ester-hydrochloride. The reaction mass is then stirred for 3 hours at room temperature and allowed to stand at 0° C. overnight. To the cooled solution are added 1.85 grams (9 millimols) of dicyclohexylcarbodiimide in 10 cc. of dimethyl formamide and the mixture allowed to react at 0° C. for 77 hours and at room temperature for 6 hours.

The precipitated urea is filtered off (780 mg.=56%), the filtrate mixed with 0.1 cc. of glacial acetic acid, the dimethyl/formamide evaporated down to a few cc. and much ethyl acetate added. After filtration of the precipitate and drying it in a high vacuum there are obtained 8.3 grams of a mixture of carbobenzoxy-hexapeptide ester and starting material.

All of the crude product is distributed between n-butanol and acetic acid of 1% strength (1:1) in a Craig apparatus with a phase volume of 100 cc.

The fractions Nos. 11–35 show a positive reaction to Pauly's reagent, while Nos. 15–35 give a positive Ehrlich reaction. Fractions 11–14 and 15–16 contain mainly carbobenzoxy-tetrapeptide and a small amount of carbobenzoxy-hexapeptide ester, whereas the fractions 19–35 contain pure protected hexapeptide ester.

The phases of fractions 19–35 are combined, evaporated to dryness and precipitated once from dimethyl formamide-ethyl acetate.

The yield of paper-chromatographically pure, amorphous carbobenzoxy-hexapeptide ester-hydrochloride is 3.8 grams. $[\alpha]_D^{25} = -16.4° \pm 0.3°$ (c.=0.793 in pyridine).

(B) FROM CBO-GLU-($NH_2$)-HIS-OH+H-PHE-ARG-TRY-GLY-OCH₃.HCl 680 mg. (0.05 millimol) of L-phenylalanyl-L-arginyl-L-tryptophyl-glycine-methyl ester-dihydrochloride which still contains ammonium chloride stemming from the catalytic hydrogenation of the Cbo-tetrapeptide ester (cf. Example 28), are dissolved in 4.5 cc. of dimethyl formamide, the solution cooled in an ice bath and treated with 0.139 cc. of triethylamine (1 millimol). After 20 minutes the separation of triethylamine-hydrochloride sets in. The reaction is allowed to proceed for 50 minutes, the separated salt is then filtered off, and a solution, cooled to 0° C., of 630 mg. (1.5 millimols) of carbobenzoxy-L-glutaminyl - L - histidine (cf. Example 23) in 3.5 cc. of dimethyl formamide is added. After another 30 minutes the dicyclohexylcarbodiimide (310 mg. in 1 cc. of dimethyl formamide=1.5 millimols) is added.

The reaction mass is allowed to stand at +3° C. for 3 days, the urea (260 mg.) then filtered off, and the product precipitated with much ethyl acetate.

There are obtained 1.1 grams of product contaminated with starting material. To remove the latter, the crude product is treated once with 5 cc., 4 times with 2 cc. of N-hydrochloric acid, and finally twice with 2 cc. of water. The product, dried over phosphorus pentoxide, weighs 600 mg.=60% of the theoretical yield.

The carbobenzoxy-hexapeptide ester precipitates in the form of amorphous dihydrochloride and has a faint pinkish hue. $[\alpha]_D^{25}=-12.5°\pm1.7°$ (c.=0.961 in pyridine).

In the systems 43, 54 and 56 (cf. column 10) the compound exhibits only one Pauly-positive and Ehrlich-positive spot, and the same $R_f$ values as the product described under (A). In this case, distribution according to Craig is unnecessary. The protected hexapeptide ester can be hydrolyzed directly with sodium hydroxide solution.

EXAMPLE 31

*p-(p'-Methoxyphenylazo) - Benzyloxy - Carbonyl - L-Glutaminyl-L-Histidyl - L - Phenylalanyl-L-Arginyl-L-Tryptophyl-Glycine-Methyl-Ester, Hydrochloride*

470 mg. (0.85 millimol) of p-(p'methoxyphenylazo)-benzyloxy-carbonyl-L-glutaminyl -L - histidine (cf. Example 26) in 14 cc. of dimethyl formamide are combined with a solution of 510 mg. (0.84 millimol) of L-phenylalanyl-L-arginyl - L - tryptophyl-glycine-methyl ester-hydrochloride (cf. Example 28) in 2 cc. of dimethyl formamide, then cooled to 0° C. and treated with 210 mg. (1 millimol) of dicyclohexylcarbodiimide in 2 cc. of dimethyl formamide. The reaction mass is kept at 0° C. for 3 days, then allowed to rise to room temperature, the urea filtered off, the unreacted carbodiimide decomposed with 0.1 cc. of glacial acetic acid and the whole evaporated to a small amount of liquid. The crude product is precipitated with a large quantity of ethyl acetate. The yield of crude product is 760 mg.

For purification, 500 mg. of substance are dissolved in 10 cc. of 75% dioxane and the solution filtered through a column of alumina (8 grams). The impurities remain behind at the top of the column as an orange-red zone.

The eluated 420 mg. are distributed between n-butanol and 1% acetic acid over 30 stages. The bulk of the MZ-hexapeptide ester is in the fractions 8–19 (G=0.88).

The fractions 10–18 are combined and distributed between secondary butanol and 1% acetic acid over 40 stages. The fractions 11–19 are recrystallized from 95% methanol. There are obtained 180 mg. of p-(p'-methoxyphenylazo)-benzyloxy-carbonyl-L - glutaminyl-L-histidyl-L-phenylalanyl - L - arginyl-L-tryptophyl-glycine-methyl ester-hydrochloride. Melting point, 202–203° C.

The ultraviolet spectrum shows: λ max. 284 mμ (ε=9800), λ max. 290 mμ (ε=10,000), λ max. 349 mμ (ε=21,200) and λ max. 435 mμ (ε=2,000).

EXAMPLE 32

*N-Carbobenzyloxy-L-Glutaminyl-L-Histidyl-L-Phenylalanyl-L-Arginyl-L-Tryptophyl-Glycine-Acetate*

450 mg. (0.39 millimol) of carbobenzoxy-hexapeptide-nitrobenzyl ester according to Example 29 are dissolved in 10 cc. of 50% dioxane and hydrolyzed for 45 minutes with ½ N-sodium hydroxide solution. The sodium hydroxide solution is added in portions so that the pH of the solution remains between 10.5 and 11. After the addition of the first 3 cc. of ½ N-sodium hydroxide solution a jelly substance begins to separate. The solution is diluted with 10 cc. of 50% dioxane. A total of 7 cc. of ½ N-sodium hydroxide solution is consumed.

Finally, the reaction solution is diluted with water, neutralized with N-hydrochloric acid and given a pH of 5.5 with a drop of glacial acetic acid.

The jelly product is filtered off, washed with ice-cold water, and the filter residue is dried over potassium hydroxide and phosphorus pentoxide under reduced pressure. The dry product weights 200 mg. and melts at 203–205° C. (after sintering at 199° C.).

From the mother liquor, another 150 mg. of carbobenzoxy-hexapeptide can be isolated. Melting point, 155–163° C.

This latter fraction, unlike the one melting at 203–205° C. is only partly in the form of the acetate as is clear from the acetyl determination.

In the paper-chromatogram, the two fractions have the same $R_f$ values in all of the three systems 43, 54 and 56 (cf. column 10).

System 43 _____ $R_f$=0.45
System 54 _____ $R_f$=0.55
System 56 _____ $R_f$=0.62

The distribution coefficients G in the system secondary butanol:1% acetic acid 1:1 are also identical for the two fractions. $[\alpha]_D^{25}=-15.9°\pm1.1°$, c.=0.944 in glacial acetic acid.

The product can be converted in the usual manner into the free hexapeptide by decarbobenzoxylation, e.g. by means of hydrogen bromide in glacial acetic acid (cf. Example 16) or by hydrogenation in the presence of 10% palladium carbon catalyst.

What is claimed is:

1. Hexapeptides of the formula L-glutamyl-L-histidyl-L-phenylalanyl-L-α-(lower aminoalkyl)-α-amino - acetyl-L-tryptophyl-glycine.

2. A member selected from the group consisting of L-glutamyl-L-histidyl-L-phenylalanyl-L - arginyl-L - tryptophyl-glycine and acid additional salts thereof with therapeutically useful acids.

References Cited in the file of this patent

Vaughan et al.: J.A.C.S., 74 (676–78), 1952.
Sheehan et al.: ibid, 77 (1067–68), 1955.
Harris et al.: Nature, 179, (1346–47), 1957.
Hofmann et al.: J.A.C.S., 79 (1641–44), 1957.
Hofmann et al.: ibid, 80, (1486–9), 1958.
Adams: Organic Reactions, vol. VII, page 265, 1954, John Wiley and Sons, Inc.